(12) United States Patent
Song et al.

(10) Patent No.: US 7,065,067 B2
(45) Date of Patent: Jun. 20, 2006

(54) AUTHENTICATION METHOD BETWEEN MOBILE NODE AND HOME AGENT IN A WIRELESS COMMUNICATION SYSTEM

(75) Inventors: Joon-Hyuk Song, Anyang-shi (KR); Chae-Yong Chong, Kwachon-shi (KR)

(73) Assignee: Samsung Electronics Co., Ltd. (KR)

( * ) Notice: Subject to any disclaimer, the term of this patent is extended or adjusted under 35 U.S.C. 154(b) by 928 days.

(21) Appl. No.: 10/140,627

(22) Filed: May 7, 2002

(65) Prior Publication Data

US 2003/0091013 A1 May 15, 2003

(51) Int. Cl.
*H04Q 7/24* (2006.01)

(52) U.S. Cl. .................... 370/338; 370/401; 455/411

(58) Field of Classification Search ............ None
See application file for complete search history.

(56) References Cited

U.S. PATENT DOCUMENTS

| | | | | |
|---|---|---|---|---|
| 6,633,761 | B1 * | 10/2003 | Singhal et al. ............... | 455/436 |
| 6,760,444 | B1 * | 7/2004 | Leung ........................ | 380/270 |
| 2002/0018456 | A1 * | 2/2002 | Kakemizu et al. .......... | 370/338 |
| 2005/0249176 | A1 * | 11/2005 | O'Neill et al. .............. | 370/338 |

OTHER PUBLICATIONS

"FA-HA Authentication", JunHyuk Song, ChaeYong Chong; Samsung Electronics, Bejing.

* cited by examiner

*Primary Examiner*—Chau Nguyen
*Assistant Examiner*—Anthony Sol
(74) *Attorney, Agent, or Firm*—Dilworth & Barrese LLP

(57) ABSTRACT

Disclosed is an authentication method between a mobile node (MN) and a home agent (HA) in a wireless communication system supporting packet communication. The wireless communication system includes the HA, a foreign agent (FA) connected to which the MN assigned a Mobile IP address, and first and second servers provided respectively to the HA and the FA for authentication. Upon receiving a Registration Request message from the MN, the FA generates an Access Request message and transmits the generated Access Request message to the first server through the second server. Upon receiving the Access Request message, the first server generates an authentication shared key with a preset number and transmits the generated authentication shared key to the FA through the second server. The FA authenticates the Registration Request message according to the authentication shared key and transmits the authenticated Registration Request message to the HA. The HA determines whether the preset number is included in the authenticated Registration Request message. The HA registers the MN when the preset number is included in the authenticated Registration Request message.

10 Claims, 3 Drawing Sheets

AUTHENTICATION METHOD BETWEEN MOBILE NODE AND HOME AGENT IN A WIRELESS COMMUNICATION SYSTEM

PRIORITY

This application claims priority to an application entitled "Authentication Method between Mobile Node and Home Agent in a Wireless Communication System" filed in the Korean Industrial Property Office on Nov. 7, 2001 and assigned Ser. No. 2001-69114, the contents of which are hereby incorporated by reference.

BACKGROUND OF THE INVENTION

1. Field of the Invention

The present invention relates generally to a wireless communication system, and in particular, to an authentication method between a mobile node (MN) and a home agent (HA) in a wireless communication system supporting packet communication.

2. Description of the Related Art

With the development of a communication technology, research has been carried out on several technologies for combining a packet-based network (hereinafter, referred to as a "packet network") using an Internet protocol (IP) with a wireless communication network. One of the more widely known technologies is a CDMA (Code Division Multiple Access) technology. The CDMA system transmits voice or data received from a wireless communication network to a packet-based IP network using an IP packet, so that the packet is finally received at a mobile node (or a mobile host) having an IP address.

An IMT-2000 (International Mobile Telecommunication-2000) system, a typical CDMA system, is a $3^{rd}$ generation wireless communication system that proposes to enable a user with one mobile node to enjoy a communication service anyplace in the world by integrating various mobile communication specifications separately operated by the respective countries. In the IMT-2000 system, a user can simultaneously access several services through one mobile node. For example, the user may attend a videoconference, while accessing graphic information over the Internet/Intranet, exchanging a multimedia e-mail, and transmitting data files. In addition, the IMT-2000 system provides global roaming service, wireless video service, remote videoconference service, bi-directional entertainment service, etc.

In a wireless communication system supporting packet communication such as the IMT-2000 system, in order for a mobile node to be provided with a packet call service through a packet network, the mobile node requires a unique address so that the packet network may identify the mobile node. This address serves as an IP address in an IP network. It is preferable that the mobile nodes have their own unique IP addresses. However, since the number of available IP addresses is limited, research has been carried out on a system for temporarily assigning an IP address only when the user uses the service. This is called a "Mobile IP" system.

In a wireless communication system supporting the Mobile IP (e.g., 3G packet network), network elements capable of assigning IP addresses to mobile nodes include two Internet access gateways: one is a packet data service node (PDSN, or a foreign agent (FA)) and another is a home agent (HA). The PDSN assigns an IP address to a mobile node requesting a Simple IP service, while the HA assigns an IP address to a mobile node requesting a Mobile IP service. An IP address assigned by the PDSN is deleted after termination of the service, whereas an IP address assigned by the HA is constantly used unless the mobile node moves to a region of another HA.

Meanwhile, IETF (Internet Engineering Task Force) RFC (Recommendation for Comments)-2002, the IP mobility support standard, defines FA-HA authentication for safe communication between the PDSN (FA) and the HA. The FA-HA authentication is positively necessary since the HA may be exposed to a DoS (Denial of Service) attack if a communication region between the FA and the HA is not protected. The FA-HA authentication defined by the RFC-2002 cannot be used in the CDMA wireless communication system. This is because the FA cannot actually share an FA-HA authentication shared key with a plurality of HAs connected to a public network. That is, this is because as the number of HAs and FAs increases, the number of the FA-HA authentication shared keys that one FA or HA should have also increase. Therefore, a method of using a separate IPSec (IP Security) protocol instead of the FA-HA authentication defined by the RFC-2002, or constructing a Virtual Private Network tunnel is considered as the FA-HA authentication method.

According to the IPSec considered for the FA-HA authentication in the wireless communication system supporting packet communication, authentication information is added to a transmission message and then encrypted in order to safely transmit the message. To this end, both sides (HA and FA) transmitting and receiving the message should have information needed for authentication and encryption. That is, the HA and FA should have information on an algorithm to be used for the authentication and the encryption, information on a key to be used for the authentication and the encryption, and information on a valid lifetime of the key. Such information may be previously shared by the HA and FA, but the information is required to be subject to a periodic change for security. To this end, in the case of the IPSec, the HA and the FA exchange the above-stated information using an IKE (Internet Key Exchange) protocol, and change the information periodically. The use of the IKE causes generation of IPSec security association (hereinafter referred to as "IPSec SA").

The use of the IKE is divided into two steps. A first step is to make a tunnel through which messages for generating an SA to be used for actual data protection are safely transmitted. That is, the first step is an operation of securing safe transmission of messages for generating the IPSec SA rather than actual user data. A second step is a process of making an IPSec SA to be used in maintaining security of the actual data through the IPSec SA made in the first step. The steps are achieved through several message exchanges. In the first step, message exchanges occur from a minimum of 3 times to a maximum of 6 times according to the message exchange method. For example, when main mode that should perform the message exchange six times is selected, an exchange of such messages as HDR, SA, KE, NI, Nr, HDR*, IDii, IDir, HASH_i and HASH_R is required between an initiator (transmitter) and a responder (receiver). Herein, HDR represents a header, SA represents a security association, KE represents a key exchange, NI represents a notice payload initiate, Nr represents a notice payload response, HDR* represents an encrypted header, IDii represents an identification payload initiate, IDir represents an identification payload response, HASH_i represents a HASH payload initiate, and HASH_R represents a HASH payload response. The second step is achieved through 3 message exchanges.

When the IPSec SA is generated, the FA and the HA protect transmission data through authentication and encryption as negotiated in the above steps. An algorithm used at this time consumes process power of the FA and the HA. Therefore, in most cases, the IPSec is constructed by software rather than hardware.

As described above, when the wireless communication system supporting packet communication secures a communication region between the FA and the HA using the IPSec, it requires an additional pre-setup message, causing a considerable increase in a processing load of the FA and the HA due to complexity of the encryption.

SUMMARY OF THE INVENTION

It is, therefore, an object of the present invention to provide a method for reducing the number of messages needed for an authentication process for safe communication between a FA and a HA in a wireless communication system supporting packet communication.

It is another object of the present invention to provide a method for preventing a DoS attack which may occur during authentication between a MN and a HA, and a method for supporting effective MN-HA authentication, by securing a FA-HA communication region through an FA-HA authentication key dynamically generated through FA-HA authentication without using IPSec in a wireless communication system supporting packet communication.

To achieve the above and other objects, the present invention provides a method for dynamically generating an FA-HA authentication shared key and preventing a DoS attack through FA-HA authentication in a wireless communication system supporting packet communication (or a Mobile IP system).

In accordance with a first aspect of the present invention, there is provided an authentication method for safe communication between a home agent (HA) and a mobile node (MN) in a wireless communication system including the HA, a foreign agent (FA) to which the MN assigned a Mobile IP address is connected, and first and second servers provided respectively to the HA and the FA for authentication. The method comprises upon receiving a Registration Request message from the MN, generating an Access Request message by the FA and transmitting the generated Access Request message to the first server through the second server; upon receiving the Access Request message, generating an authentication shared key with a preset number by the first server and transmitting the generated authentication shared key to the FA through the second server; authenticating by the FA the Registration Request message according to the authentication shared key and transmitting the authenticated Registration Request message to the HA; determining by the HA whether the preset number is included in the authenticated Registration Request message; and registering the MN by the HA when the preset number is included in the authenticated Registration Request message.

In accordance with a second aspect of the present invention, there is provided an authentication method for safe communication between a home agent (HA) and a mobile node (MN) in a wireless communication system including the HA, a foreign agent (FA) to which the MN assigned a Mobile IP address is connected, and first and second servers provided respectively to the HA and the FA for authentication. The method comprises upon receiving a Registration Request message from the MN, generating an Access Request message by the FA and transmitting the generated Access Request message to the first server through the second server; upon receiving the Access Request message, generating a first authentication shared key with a preset number by the first server and transmitting the generated first authentication shared key to the FA through the second server; authenticating by the FA the Registration Request message according to the first authentication shared key and transmitting the authenticated Registration Request message to the HA; determining by the HA whether the preset number is included in the authenticated Registration Request message; transmitting a message requesting the preset number from the HA to the first sever, when the preset number is not included in the authenticated Registration Request message; transmitting the requested preset number from the first server to the HA; and generating by the HA a second authentication shared key with the preset number transmitted from the first server and registering the MN.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

First, a description will be made of a wireless communication system supporting packet communication to which the present invention is applied. Next, a description will be made of a procedure for processing a Mobile IP service between a mobile node (MN) and a home agent (HA) in a wireless communication system, using an authentication method according to an embodiment of the present invention. The embodiment of the present invention provides a method for generating and transmitting a shared key used in making a FA-HA authentication extension message defined to support safe communication between a PDSN (FA) and the HA. Therefore, the embodiment of the present invention defines a method for generating and transmitting an FA-HA authentication shared key that is not defined in the prior art, and an update method for maintaining security of the FA-HA authentication shared key.

Figure 1:
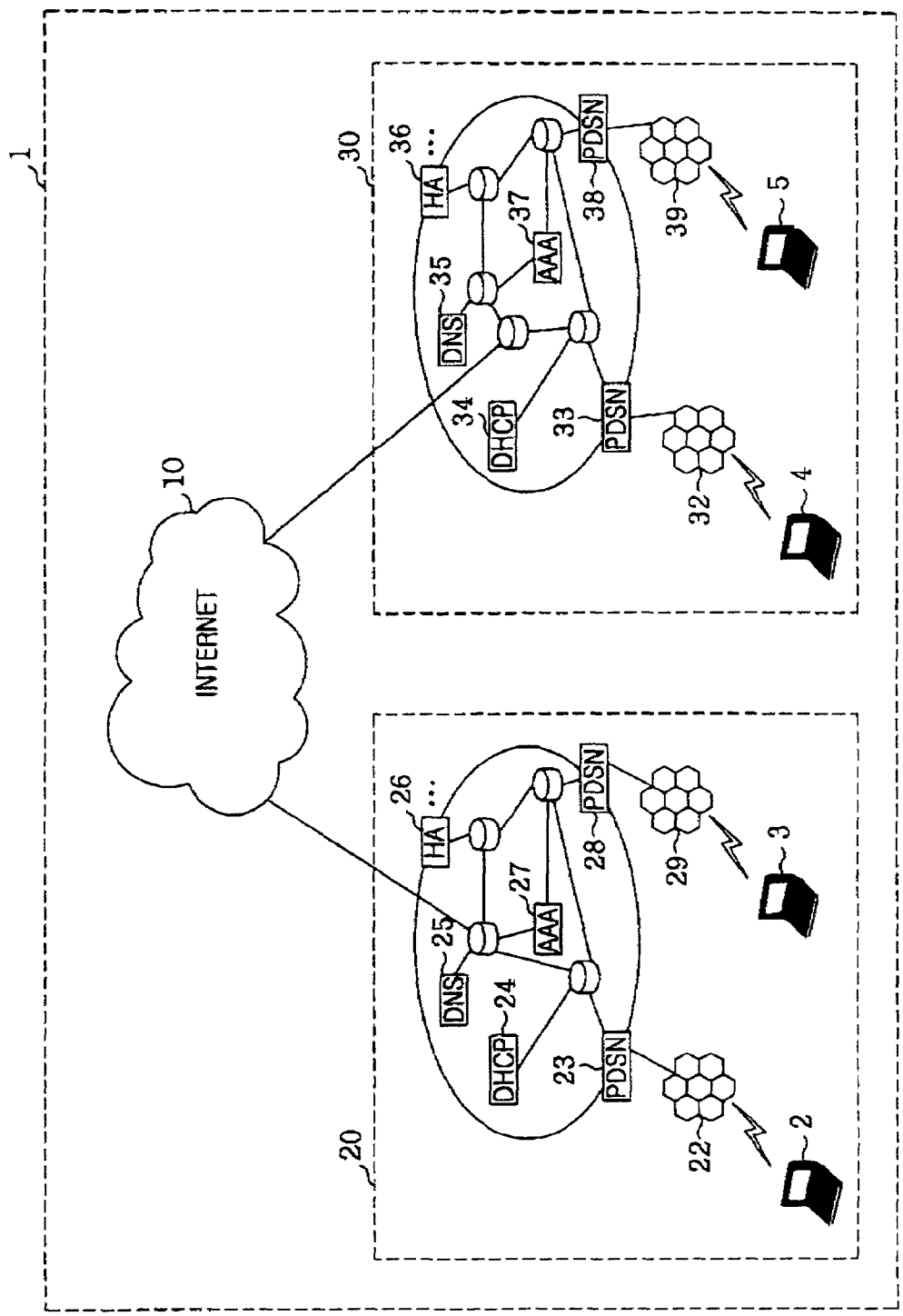
FIG. 1 illustrates a configuration of a wireless communication system supporting packet communication system (or a Mobile IP system), to which the present invention is applied.

FIG. 1 illustrates a configuration of a wireless communication system supporting packet communication system (or a Mobile IP system), to which the present invention is applied. Referring to FIG. 1, a packet communication system supporting a dynamic IP service is constructed based on domains 20 and 30, and the domains 20 and 30 are connected to each other through Internet 10. The IP supported domain 20 is comprised of mobile communication systems 22 and 29, and other network elements for a packet call service. Also, the IP supported domain 30 is comprised of mobile communication systems 32 and 39, and other network elements for a packet call service. The mobile communication system 22, 29, 32 and 39 each include a BTS (Base Transceiver System) and a BSC (Base Station Controller), which constitute the known digital cellular network, PCS (Personal Communications Service) network, and IMT-2000 (CDMA-2000 or UMTS) network. Further, the other network elements for a packet call service include HAs (Home Agents) 26 and 36 for supporting the dynamic IP service, PDSNs (Packet Data Service Nodes) 23, 28, 33 and 38, AAAs (Authentication, Authorization & Accounting servers, or Radius servers) 27 and 37, DNS (Domain Name System) server 25 and 35, and DHCP (Dynamic Host Configuration Protocol) servers 24 and 34.

Mobile nodes 2, 3, 4 and 5 serve as a mobile host defined by RFC-2002, and are connected to the PDSNs 23, 28, 33 and 38 through radio channels, respectively. The PDSNs 23, 28, 33 and 38, and the HAs 26 and 36 also perform the function defined by RFC-2002. The PDSNs and the HAs assign IP addresses to the MNs requiring a packet call service. The IP addresses assigned by the PDSNs are changed each time the MN moves to a region of another PDSN, whereas the IP addresses assigned by the HAs are fixed in the corresponding domain.

The AAA servers 27 and 37 perform authentication, authorization and accounting on a subscriber to the wireless communication network. A security channel is established between the AAA servers. In addition, the AAA servers 27 and 37 identify subscribers using NAI (Network Access Identifier), connect NAI (mobile host name and IP address of PDSN) to the DNS servers 25 and 35, and perform DNS update through the security channel between the AAA servers when they are dynamically assigned IP addresses. That is, a counterpart host desiring to communicate with the mobile host cannot recognize the dynamically assigned IP address of the mobile host, so the DNS servers 25 and 35 should be dynamically updated.

The DNS servers 25 and 35 are gigantic distributed naming systems for mapping the domain names to the IP addresses. The DNS servers 25 and 35 map the fixed domain names to variable IP addresses by dynamically updating the domain names at the request of the network elements. As well known, the domain names, typically character-type addresses used to identify hosts connected to the Internet, are easy to memorize and intuitive compared with the IP addresses simply comprised of an arrangement of numbers.

Figure 2:
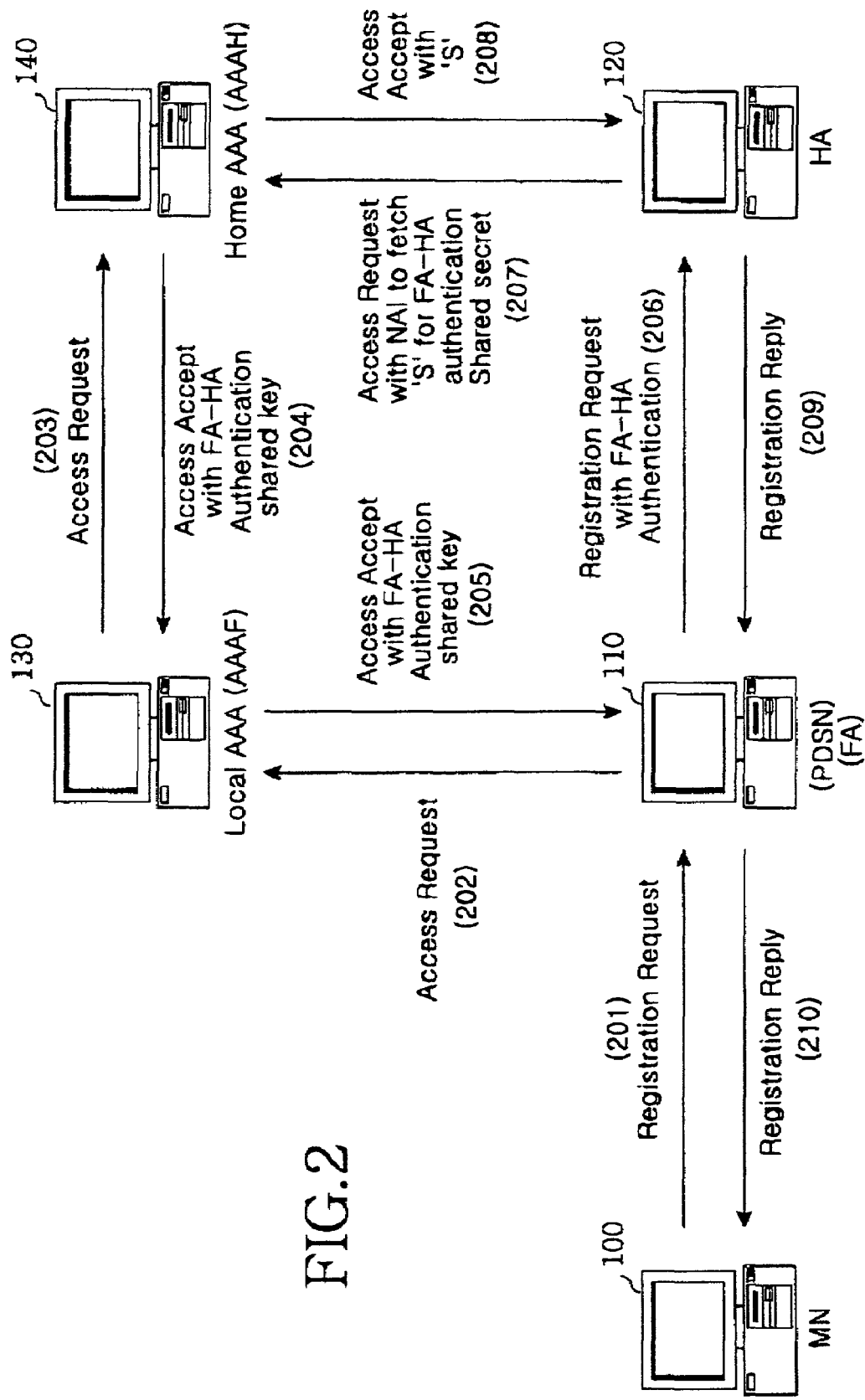
FIGS. 2 and 3 illustrate a procedure for processing a Mobile IP service between a MN and a HA in a wireless communication system using an authentication method according to an embodiment of the present invention.
Figure 3:
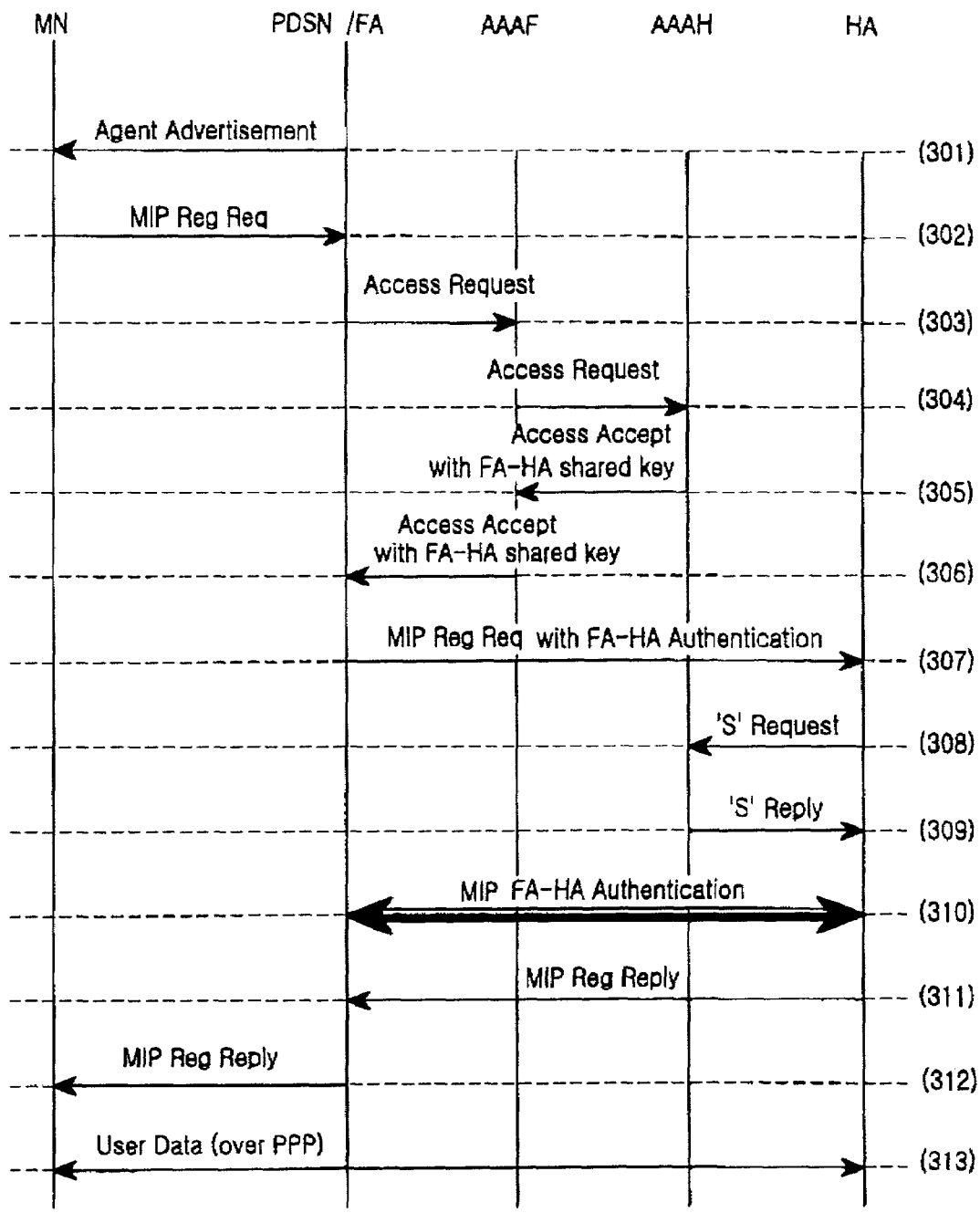

FIGS. 2 and 3 illustrate a procedure for processing a Mobile IP service between a MN and a HA in a wireless communication system using an authentication method according to an embodiment of the present invention. This procedure includes a HA-FA authentication method for safe communication between the HA and the FA (PDSN).

Shown in Table 1 are definitions of the terms used herein.

TABLE 1

| Term | Definition |
|---|---|
| MN | Mobile Node |
| FA | Foreign Agent |
| HA | Home Agent |
| PDSN | Packet Data Service Node |
| AAAF | Second Server (Local AAA) or Authentication, Authorization & Accounting Server in Foreign side |
| AAAH | First Server (Home AAA) or Authentication, Authorization & Accounting Server in Home side |
| MIP | Mobile IP |

Referring to FIG. 2, an MN 100 transmits a Registration Request message to an FA 110 (step 201). In reply to the Registration Request message, the FA 110 transmits an Access Request to an AAAF 130 for authentication request (step 202). The AAAF 130 then transmits an Access Request to an AAAH 140 in reply to the Access Request from the FA 110 (step 203). Upon receiving the Access Request with RADIUS attribute requiring an FA-HA authentication shared key from the AAAF 130, the AAAH 140 generates 'S' and timestamp, factors for generating the FA-HA authentication shared key. The AAAH 140 generates the FA-HA authentication shared key by substituting the 'S' and the timestamp into an HMAC-MD5 hashing algorithm along with other factors. Here, the "other factors" include an AAAH IP address, a FA IP address and a HA IP address. The generated FA-HA authentication shared key is defined as FA-HA Authentication Shared Key=HMAC-MD5
(AAAH IP address, HA IP address, FA IP
address, timestamp, 'S')     Equation (1)

In Equation (1), 'S' key is a preset number generated by the AAAH 140, and has a lifetime that can be set according to a local policy. An HA 120 can receive the 'S' through an Access Accept message from the AAAH 140 (step 208). An operation of receiving the 'S' from the AAAH 140 by the HA 120 will be described later. The "AAAH IP address" represents an IP address of the AAAH 140 to which the MN 100 belongs. The "HA IP address" represents an IP address of the HA 120, assigned by the AAAH 140 to be serviced by the corresponding MN. The "TA IP address" represents an IP address of the FA 110 accessed by the MN 100. The "timestamp" represents a lifetime of the 'S' key. The HMAC-MD5 hashing algorithm is a combination of MD5 and HMAC. Here, MD5 is a hashing algorithm, and HMAC is a key generation algorithm for complementing security strength and reducing key size.

For example, if AAAH IP address is 165.213.68.2, HA IP Address is 165.213.69.10, FA IP Address is 165.213.176.237, timestamp is 32-bit lifetime, and S is 32-bit S key, then FA-HA authentication shared key is generated through HMAC-MD5 (165.213.68.2|165.213.69.10|165.213.176.237|timestamp|S).

The FA-HA authentication shared key and timestamp generated by the AAAH 140 are transmitted to the FA 110 through the AAAF 130 over an Access Accept message (steps 204 and 205). The FA 110 then makes an FA-HA authentication extension message using the received FA-HA authentication shared key, attaches it to a Registration Request message, and transmits the Registration Request message to the HA 120 assigned to the MN 100 (step 206). That is, the FA 110 transmits a Mobile IP (MIP) Registration Request message to the HA 120. Upon receiving the Mobile IP Registration Request message, the HA 120 determines whether there exists an 'S' key related to the FA 110 that has transmitted the Mobile IP Registration Request message. When there exists no 'S' key related to the FA 110 or a valid lifetime of the key has expired, the HA 120 transmits an Access Request to fetch a new 'S' to the AAAH 140, and then receives a new 'S' from the AAAH 140 (steps 207 and 208). In this case, the HA 120 generates a FA-HA authentication shared key and an authentication key by the HMAC-MD5 hashing algorithm using the same factors as used by the AAAH 140. When authentication of a Mobile IP Registration Request message is passed using the generated FA-HA authentication shared key, the HA 120 processes the message, and then transmits a Mobile IP Registration Reply message to the MN 100 through the FA 110 (steps 209 and 210).

Referring to FIG. 3, the PDSN (or FA) 110 transmits an Agent Advertisement message to the MN 100 (step 301). Upon receiving the Agent Advertisement message, the MN 100 transmits a MIP Registration Request message to the FA 110 (step 302). Upon receiving the MIP Registration Request message, the PDSN (FA) 110 transmits an Access Request message with MN-AAA authentication information, NAI (Network Access Identifier) and COA (Core-Of-Address) to the AAAF 130 (step 303). Upon receiving the Access Request message from the FA 110 in step 303, the AAAF 130 transmits an Access Request message with MN-AAA authentication information, NAI and COA to the AAAH 140 (step 304).

Upon receiving the Access Request message from the AAAF 130 in step 304, the AAAH 140 performs user authentication through MN-AAA authentication, generates a FA-HA authentication shared key by substituting such factors as AAAH IP address, FA IP address, HA IP address, 'S' and timestamp into the HMAC-MD5 hashing algorithm, and then transmits an Access Accept message with the generated FA-HA authentication shared key to the AAAF 130 (step 305). Upon receiving the FA-HA authentication shared key from the AAAH 140 in step 305, the AAAF 130 transmits an Access Accept message with the received FA-HA authentication shared key to the PDSN (FA) 110 (step 306). Upon receiving the authentication shared key from the AAAF 130 in step 306, the PDSN (FA) 110 authenticates an MIP Registration Request message using the FA-HA authentication shared key, and then transmits the MIP Registration Request message to the HA 120 (step 307). Upon receiving the MIP Registration Request message authenticated with the FA-HA authentication key in step 307, the HA 120 determines whether there exists a valid 'S' in the received MIP Registration Request message. By previously receiving information on the valid 'S' from the AAAH 140, the HA 120 can use it in an operation of step 307.

If there exists no valid 'S', the HA 120 transmits an 'S' Request message to the AAAH 140 (step 308). Upon receiving the 'S' Request message in step 308, the AAAH 140 transmits an 'S' Reply message with 'S' to the HA 120 (step 309). Upon receiving the requested 'S', the HA 120 generates a FA-HA authentication shared key by substituting such factors as AAAH IP address, FA IP address, HA IP address, 'S' and timestamp into the HMAC-MD5 hashing algorithm. After generating the FA-HA authentication shared key, the HA 120 authenticates the MIP Registration Request from the MN 100 (step 310).

After processing the MIP Registration Request, the HA 110 transmits a MIP Registration Reply message to the PDSN (FA) 110 in reply to the MIP Registration Request (step 311). Upon receiving the MIP Registration Reply message in reply to the MIP Registration Request in step 311, the PDSN (FA) 110 transmits a MIP Registration Reply message to the MN 100 in reply to the MIP Registration Request (step 312).

After the steps 301 to 312, user data is exchanged between the MN 100 and the HA 120 over a PPP (Point-to-Point Protocol). For information, the steps 302 to 306 correspond to the steps 201 to 205 of FIG. 2, and the steps 307 to 312 correspond to the steps 206 to 210 of FIG. 2.

As described above, in the wireless communication system supporting packet communication according to the present invention, the HA and the AAAH dynamically generate a FA-HA authentication shared key using a preset number 'S' instead of the IPSec, and use an Access message defined by the RFC-2002, thus making it possible to improve security in a region between the FA and the HA while maintaining compatibility with the existing protocol.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An authentication method for safe communication between a home agent (HA) and a mobile node (MN) in a wireless communication system including the HA, a foreign agent (FA) connected to the MN assigned a Mobile IP address, and first and second servers provided respectively to the HA and the FA for authentication, comprising the steps of:

upon receiving a Registration Request message from the MN, generating by the FA an Access Request message and transmitting to the first server through the second server the generated Access Request message;

upon receiving the Access Request message, generating by the first server an authentication shared key with a preset number by the first server and transmitting to the FA through the second server the generated authentication shared key;

authenticating by the FA the Registration Request message according to the authentication shared key and transmitting to the HA the authenticated Registration Request message;

determining by the HA whether the preset number is included in the authenticated Registration Request message; and registering by the HA the MN when the preset number is included in the authenticated Registration Request message.

2. The authentication method as claimed in claim 1, further comprising the step of transmitting from the HA to the MN through the FA a Registration Reply message indicating registration of the MN.

3. The authentication method as claimed in claim 1, wherein the authentication shared key is generated by substituting the preset number into an HMAC-MD5 hashing algorithm.

4. The authentication method as claimed in claim 1, wherein the authentication shared key is generated by substituting an IP address of the first server, an IP address of the FA and an IP address of the HA into an HMAC-MD5 hashing algorithm.

5. The authentication method as claimed in claim 4, wherein the authentication shared key further includes a factor for determining a lifetime of the preset number.

6. An authentication method for safe communication between a home agent (HA) and a mobile node (MN) in a wireless communication system including the HA, a foreign agent (FA) connected to the MN assigned a Mobile IP address, and first and second servers provided respectively to the HA and the FA for authentication, comprising the steps of:

upon receiving a Registration Request message from the MN, generating by the FA an Access Request message and transmitting to the first server through the second server the generated Access Request message;

upon receiving the Access Request message, generating by the first server a first authentication shared key with a preset number and transmitting to the FA through the second server the generated first authentication shared key;

authenticating by the FA the Registration Request message according to the first authentication shared key and transmitting to the HA the authenticated Registration Request message;

determining by the HA whether the preset number is included in the authenticated Registration Request message;

transmitting from the HA to the first server a message requesting the preset number, when the preset number is not included in the authenticated Registration Request message;

transmitting to the HA the requested preset number from the first server; and generating by the HA a second authentication shared key with the preset number transmitted from the first server and registering the MN.

7. The authentication method as claimed in claim 6, further comprising the step of transmitting from the HA to the MN through the FA a Registration Reply message indicating registration of the MN.

8. The authentication method as claimed in claim 6, wherein the first and second authentication shared keys are generated by substituting the preset number into an HMAC-MD5 hashing algorithm.

9. The authentication method as claimed in claim 6, wherein the first and second authentication shared keys are generated by substituting an IP address of the first server, an IP address of the FA and an IP address of the HA into an HMAC-MD5 hashing algorithm.

10. The authentication method as claimed in claim 9, wherein the first and second authentication shared keys each further include a factor for determining a lifetime of the preset number.

* * * * *

UNITED STATES PATENT AND TRADEMARK OFFICE
CERTIFICATE OF CORRECTION

| | | |
|---|---|---|
| PATENT NO. | : 7,065,067 B2 | Page 1 of 1 |
| APPLICATION NO. | : 10/140627 | |
| DATED | : June 20, 2006 | |
| INVENTOR(S) | : Joon-Hyuk Song et al. | |

It is certified that error appears in the above-identified patent and that said Letters Patent is hereby corrected as shown below:

Title page, item (30) Foreign Application Priority Data: please add

November 7, 2001 (KR) ...... 2001-0069114

Signed and Sealed this

Twenty-third Day of January, 2007

JON W. DUDAS
*Director of the United States Patent and Trademark Office*